(12) United States Patent
Liu et al.

(10) Patent No.: US 10,042,931 B2
(45) Date of Patent: Aug. 7, 2018

(54) DATA QUERY METHOD AND APPARATUS

(71) Applicant: Alibaba Group Holding Limited, Grand Cayman (KY)

(72) Inventors: Hao Liu, Hangzhou (CN); Shuai Shao, Hangzhou (CN); Chunxiao Li, Hangzhou (CN); Baiping Hou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 376 days.

(21) Appl. No.: 14/742,433

(22) Filed: Jun. 17, 2015

(65) Prior Publication Data
US 2015/0370897 A1 Dec. 24, 2015

(30) Foreign Application Priority Data
Jun. 18, 2014 (CN) .......................... 2014 1 0273954

(51) Int. Cl.
*G06F 17/30* (2006.01)
*G06Q 10/06* (2012.01)

(52) U.S. Cl.
CPC ..... *G06F 17/30864* (2013.01); *G06Q 10/067* (2013.01)

(58) Field of Classification Search
CPC .................. G06F 17/30864; G06Q 10/067
See application file for complete search history.

(56) References Cited

U.S. PATENT DOCUMENTS

| 5,511,186 A | 4/1996 | Carhart et al. | |
| 6,009,422 A * | 12/1999 | Ciccarelli | ......... G06F 17/30439 |
| 9,104,762 B1 * | 8/2015 | Ward | ............... G06F 17/30864 |
| 2002/0120618 A1 * | 8/2002 | Ushijima | .......... G06F 17/30471 |
| 2005/0076024 A1 | 4/2005 | Takatsuka et al. | |
| 2006/0074881 A1 | 4/2006 | Vembu et al. | |
| 2008/0059429 A1 | 3/2008 | Kojima et al. | |

(Continued)

OTHER PUBLICATIONS

PCT Search Report and Written Opinion dated Mar. 23, 2016 for PCT Application No. PCT/US15/36276, 8 pages.

(Continued)

*Primary Examiner* — Jared M Bibbee
(74) *Attorney, Agent, or Firm* — Lee & Hayes, PLLC

(57) ABSTRACT

A method and an apparatus of querying data are provided. The data is stored in at least two different databases. The method includes: receiving a query request based on a business model, the business model including business elements; converting the query request into an execution mode that matches with databases to be queried according to a conversion rule between the business model and a storage model, the storage model including attribute information of the queried databases and the conversion rule including a corresponding relationship between the business elements and attributes in the queried databases; and accessing a corresponding database according to the execution mode. The technical solutions of the present disclosure prevent the data from being imported and exported between different databases and have no limitations on applicable databases. Furthermore, a difference between low-level databases is masked at a user level and the convenience and completeness of querying is improved.

20 Claims, 4 Drawing Sheets

(56) References Cited

U.S. PATENT DOCUMENTS

| | | |
|---|---|---|
| 2011/0270843 A1 | 11/2011 | Albin |
| 2012/0029967 A1* | 2/2012 | Kukreja ............... G06Q 10/06 705/7.25 |
| 2012/0173515 A1* | 7/2012 | Jeong ............... G06F 17/30569 707/718 |
| 2013/0060803 A1* | 3/2013 | Maman ............ G06F 17/30427 707/760 |
| 2013/0117303 A1 | 5/2013 | Morimatsu et al. |
| 2014/0195514 A1* | 7/2014 | Stein ............... G06F 17/30566 707/722 |
| 2014/0280328 A1* | 9/2014 | Nyman ............ G06F 17/30389 707/770 |

OTHER PUBLICATIONS

The Extended European Search Report dated Jan. 2, 2018 for European patent application No. 15809236.1, 5 pages.

\* cited by examiner

DATA QUERY METHOD AND APPARATUS

CROSS REFERENCE TO RELATED PATENT APPLICATION

This application claims foreign priority to Chinese Patent Application No. 201410273954.X filed on Jun. 18, 2014, entitled "Data Query Method and Apparatus", which is hereby incorporated by reference in its entirety.

TECHNICAL FIELD

The present disclosure relates to the field of database technologies, and in particular to data query methods and apparatuses.

BACKGROUND

With the development of social networks and mobile internet, the amount of data has increased explosively, and the volume of data volume generated during the past few years exceeds the amount of data that was produced over thousands of years. Data has become the most valuable resource of enterprises. With the development of technologies such as data mining and data analysis, enterprise decision making increasingly relies on data. Comprehensive and complete data will provide better support in decision-making.

Data which is accessible by an enterprise often involves many different types of storage engines and storage modes, for example, databases of an RDS (Relational Database Service) type which include storage engines such as Oracle, MySQL and OceanBase, etc., and databases of a KV (Key-Value) type which include storage engines such as Tair and Hbase, etc. If a certain upper business needs to perform a query in all of these databases, a certain degree of difficulty in implementation exists.

In existing technologies, a Polybase technology of Microsoft may realize associated query of Hadoop data and relational databases by exportation or importation of data in a PDW (Parallel Data Warehouse) from or into Hadoop, so that parts of the above-mentioned functions may be realized. However, importing/exporting the data into/from the Hadoop still needs a considerable workload, and is not applicable to each storage engine (for example, not applicable to Tair, OceanBase, etc.), which affects the completeness of data query.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method of querying data, with the data being stored in at least two different databases. In embodiments, the method includes: receiving a query request based at least in part on a business model, the business model including business element(s); converting the query request into execution mode(s) which is/are matched with database(s) to be queried based at least in part on a conversion rule between the business model and a storage model, the storage model including attribute information of the database(s) to be queried, and the conversion rule including a corresponding relationship between the business element(s) and attribute(s) in the database(s) to be queried; and accessing a corresponding database according to the execution mode(s).

The present disclosure further provides an apparatus of querying data, the data being stored in at least two different databases. The apparatus comprises: a request receiving unit to receive a query request based on a business model, the business model including business element(s); a conversion unit to convert the query request into execution mode(s) which is/are matched with database(s) to be queried according to a conversion rule from the business model to a storage model, the storage model including attribute information of the database(s) to be queried, and the conversion rule including a corresponding relationship between the business element(s) and attributes in the database(s) to be queried; and a database access unit to access a corresponding database according to the execution mode(s).

As can be seen from the above technical solutions, the embodiments of the present disclosure convert a data request of a user based on a business model into an execution mode for a database to be queried according to a conversion rule from the business model to a storage model, thus not only avoiding the data from being imported and exported between different databases, and also imposing no limitations of applicability on the databases. Furthermore, a difference among low-level databases is masked at a user level, thus improving the convenience and completeness for performing a query.

DETAILED DESCRIPTION

Embodiments of the present disclosure provide a new method of querying data to solve problems in existing technologies. In an embodiment of the present disclosure, business feature(s) is/are summarized according to a business demand, and a business model that is business-oriented is generated. A storage model is generated based on factors such as storage engine(s), data storage structure(s) and storage mode(s), etc., of accessed database(s). A conversion rule is established between the business model and the storage model for converting a query submitted by a user from a business prospective into a query instruction that matches with the accessed database(s), thus being applicable to any type of databases. Furthermore, the user only needs to focus on business, and a data difference at a low level is masked.

With respect to a business model, specific business scenario(s) is/are usually analyzed by business personnel, and each piece of information which is needed for completing the business scenario(s) is used as a business element. An association relationship among business elements is summarized in combination with characteristics of an associated business, such that a business model which describes the business scenario(s) is generated.

Figure 1:
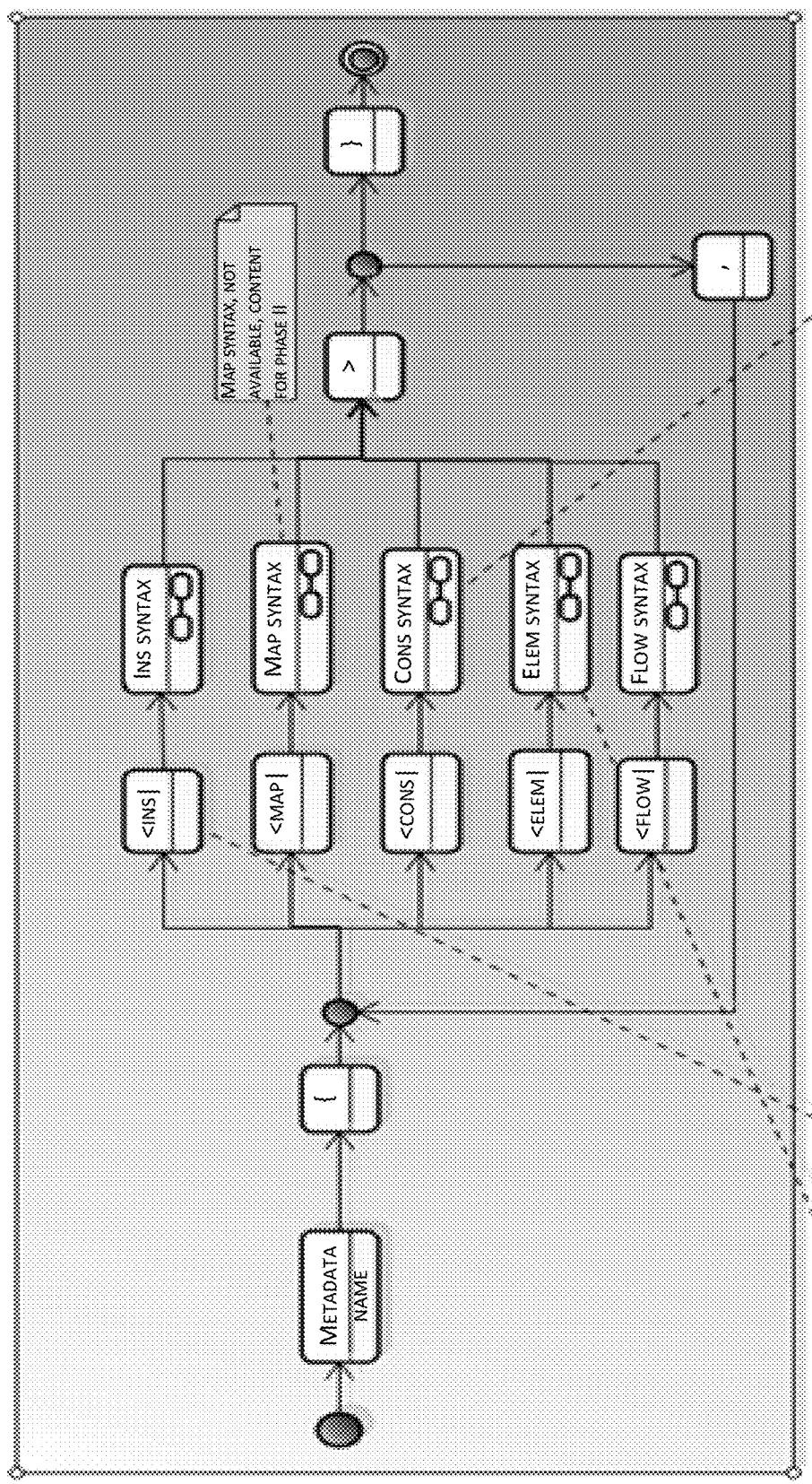
FIG. 1 is a schematic diagram of metadata description of a business model in accordance with an embodiment of the present disclosure.

In an implementation, a metadata format may be used to describe a business model of a business scenario. For example, a business model may be described using the following metadata, with a schematic diagram thereof being illustrated in FIG. 1:
- a business element subset that defines business elements included in a business model;
- a constraint subset that defines constraint information of the business elements and/or constraint information among the business elements, such as a value range of a business element, and certain business elements that cannot be used at the same time, etc.;
- an instance subset that defines instance information of the business elements, i.e., which instances are described by the business elements;
- a flow subset that defines data flow information, i.e., a flow of a time sequence, an action etc., that is/are related to the business elements; and
- a mapping subset that defines a mapping relationship between the present business model and other business models, including association, correspondence and mutual conversion with the other models.

A specific business scenario—customer management is used as an example. Metadata description summarizing a business model—a customer model—with abstracted business features, which includes:
- a business element subset: a customer number, a customer name, a customer type and a customer contact method;
- a constraint subset: the customer number and the customer name cannot be empty; the customer type is of either an individual or an organization; and
- an instance subset: an instance of the customer model includes an individual customer and an organization customer.

By using a metadata language, a business element and a modeling method of a business model are unified at a higher abstraction layer, which provides a complete, shared and consistent view of the business element and the business model.

In an embodiment of the present disclosure, a storage model may describe data storage(s) of database(s) that is/are queried, which includes defining necessary information needed for the data storage(s), and may further include common information of respective type(s) of real storage engine(s). Specifically, the storage model includes attribute information of the database(s) that is/are queried, source name(s) of stored data, source type(s) of the stored data, storage sharding (or fragmentation) mode(s) and/or name(s) of stored data region(s).

The attribute information of the queried database(s) includes attributes of entity type(s) in the database(s). The source name(s) of the stored data includes information needed for establishing connection to the queried database(s). The source type(s) of the stored data may include information such as storage engine(s) of the queried database(s). The storage sharding mode(s) may include a read-write separation, a horizontal sharding, etc. The name(s) of the stored data region(s) may be a table for a relational database, a naming space for a KV storage, etc.

Specific Information included in a storage model may be determined based on a need of a specific application scenario. For example, if all databases that are queried adopt a same sharding mode and have a same source type of stored data, the storage model may not include these two items.

The storage model may be generated manually or may be automatically generated by a program.

Figure 2:
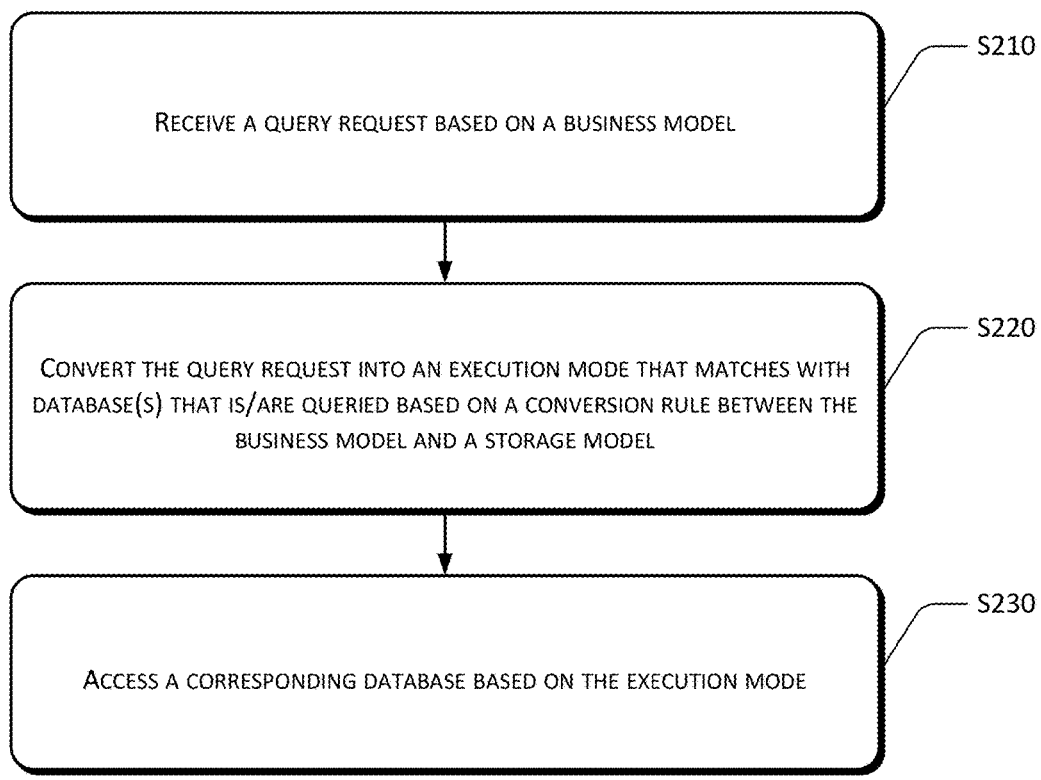
FIG. 2 is a flowchart of a method of data query in accordance with an embodiment of the present disclosure.

The method of data query in the embodiments of the present disclosure is applied to a scenario where data that is queried is stored in at least two different databases. A difference between these databases refers to a difference in specific implementations thereof when a same query is conducted for these databases, for example, a difference in storage engines that are used, a difference in organized formats of the data in case of a same storage engine, etc. In this embodiment, a flowchart of the method of data query is shown in FIG. 2.

At S210, a query request based on a business model is received.

In this embodiment, a query mode based on a business model is provided to a user. Since the business model is based on business element(s), the query request of the user generally includes a query condition based on the business element(s). As described above, the business model is formed by abstraction of business scenario(s), and the query mode based on the business model may enable the user to focus on a business demand without considering a difference between different databases at a low level.

A format of the query request may be self-defined according to the business demand, or may be defined with reference to query instruction(s) of the database(s), which are not limited by the embodiments.

In an embodiment, the query request may include two query conditions based on the business element(s): a storage acquisition condition and a result filtering condition that are based on the business element(s). The storage acquisition condition is used as a query condition to convert the query request into execution mode(s) that match(es) with the database(s) that is/are queried. The result filtering condition is used as a condition for filtering results to screen access results acquired from each database (i.e., screening query results acquired at S230).

By way of examples, the business-oriented query request may use a CQL (Cassandra Query Language) as a medium and adopt a class sql (Structured Query Language) based on metadata of the business model for describing query semantics completely and unambiguously as much as possible.

A possible CQL statement is given as follows:
SELECT [business element, business model] FROM [business model]
ID business element determination condition 1 [AND business element determination condition 2]
[WHERE business element determination condition 3 [AND business element determination condition 4]]

The above statement means: searching business element(s) or business model(s) which satisfies/satisfy a business element determination condition 1, a business element determination condition 2 (optional), a business element determination condition 3 (optional) and a business element determination condition 4 (optional) from business models. The business element determination condition 1 and the business element judgment determination 2 are storage acquisition conditions, and the business element determination condition 3 and the business element determination condition 4 are result filtering conditions.

At S220, the query request is converted into execution mode(s) which match(es) with database(s) that is/are queried according to a conversion rule between the business model and a storage model.

The conversion rule between the business model and the storage model associates business element(s) in the business model with data stored in database(s) that is/are queried, and converts the business-oriented query request into query instruction(s) for the queried database(s), thus converting the query request received from the user into an execution mode that matches with the database(s).

The conversion rule includes a corresponding relationship between the business element(s) and attributes in the queried database(s). For example, if a business model named as CsCustomer includes a business element UserType, and a storage model named as cs_customer includes an attribute user_type, a conversion rule from the business model CsCustomer to the storage model cs_customer may be: [CsCustomer, UserType, cs_customer, user_type, oneToOneMapping], which means that the business element UserType in the business model Customer is in the attribute field user_type in the storage model cs_customer, and a relationship between this business element and the attribute is a one-to-one mapping (i.e., a respective value in a database is the same as a corresponding value in a business model). When the query request is converted into the execution mode which matches with the queried database(s) according to the conversion rule, the query condition(s) (and perhaps query object(s) also) is/are converted from business element description to attribute description of the database(s) according to the corresponding relationship between the business element(s) and the attribute(s).

According to the specific business scenario(s) as well as the business model and the storage model that are adopted, the conversion rule may also include other rule(s) that is/are needed for converting the query request into the access instruction(s) for the database(s). For example, if the databases that are queried employ different storage engines (e.g., including an Oracle database and a Tair database), the conversion rule may further include source types of stored data of the queried databases. When the query request is converted into execution mode(s) that match(es) with the databases that are queried according to the conversion rule, the query request is converted into execution mode(s) that match(es) with types of storage engines according to the types of the storage engines of the databases that are queried.

The conversion rule may be generated manually or may be generated automatically by a program according to the business model and the storage model. The embodiments of the present disclosure do not have any limitations on how to generate a conversion rule.

It should be noted that the execution mode(s) that match(es) with the database(s) that is/are queried may be an execution mode that directly accesses the database(s) and directly performs a query in the database(s), or an execution mode that accesses the database(s) by calling certain middleware of the database(s), which is not limited in the embodiments, provided that a query result may be acquired from the database(s) that are accessed.

At S230, a corresponding database is accessed according to the execution mode.

After the query request of the user that is based on the business model is converted into the execution mode corresponding to the database(s) that is/are queried, a corresponding database is accessed according to the above-mentioned execution mode to acquire query result(s).

In an implementation, a control over the execution mode of the queried database(s) may be improved. Examples include delaying an execution of subsequent query requests in an event that an amount of concurrent accesses to a certain database that is queried exceeds a certain amount, routing a current query request to a backup having a smaller access amount when a certain database that is queried has a plurality of physical storage backups, etc.

As can be seen, the embodiments of the present disclosure convert a data request of a user based on a business model into an execution mode for database(s) that is/are queried according to a conversion rule from the business model to a storage model, thus not only avoiding the data from being imported and exported between different databases, but also having no limitations of applicability on databases. Furthermore, a difference among low-level databases is masked at a user level, thus improving the convenience and completeness of query.

Figure 3:
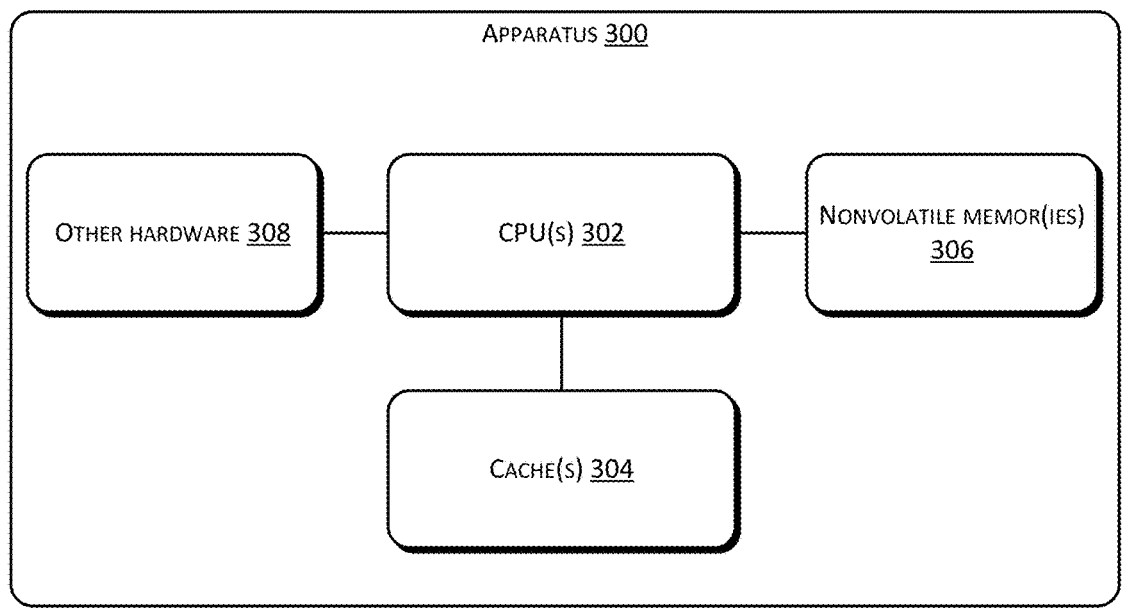
FIG. 3 is a structural diagram illustrating a hardware component of a computing device.

Corresponding to the implementations of the aforementioned processes, the embodiments of the present disclosure further provide an apparatus of querying data, which is used in a computing device having a networking function, such as a server, a computer, a mobile phone, etc. The apparatus may be implemented by means of software, and may also be realized through hardware or a combination of software and hardware. A software implementation is used as an example. Logically, an apparatus is formed by reading corresponding computer program instruction(s) into memory via CPU(s) of a device thereof for execution. In terms of hardware, in addition to CPU(s) 302, cache(s) 304 and nonvolatile memor(ies) 306 as shown in FIG. 3, an apparatus 300 where the data query apparatus is located may generally also include other hardware 308 such as chip(s) for communications.

Figure 4:
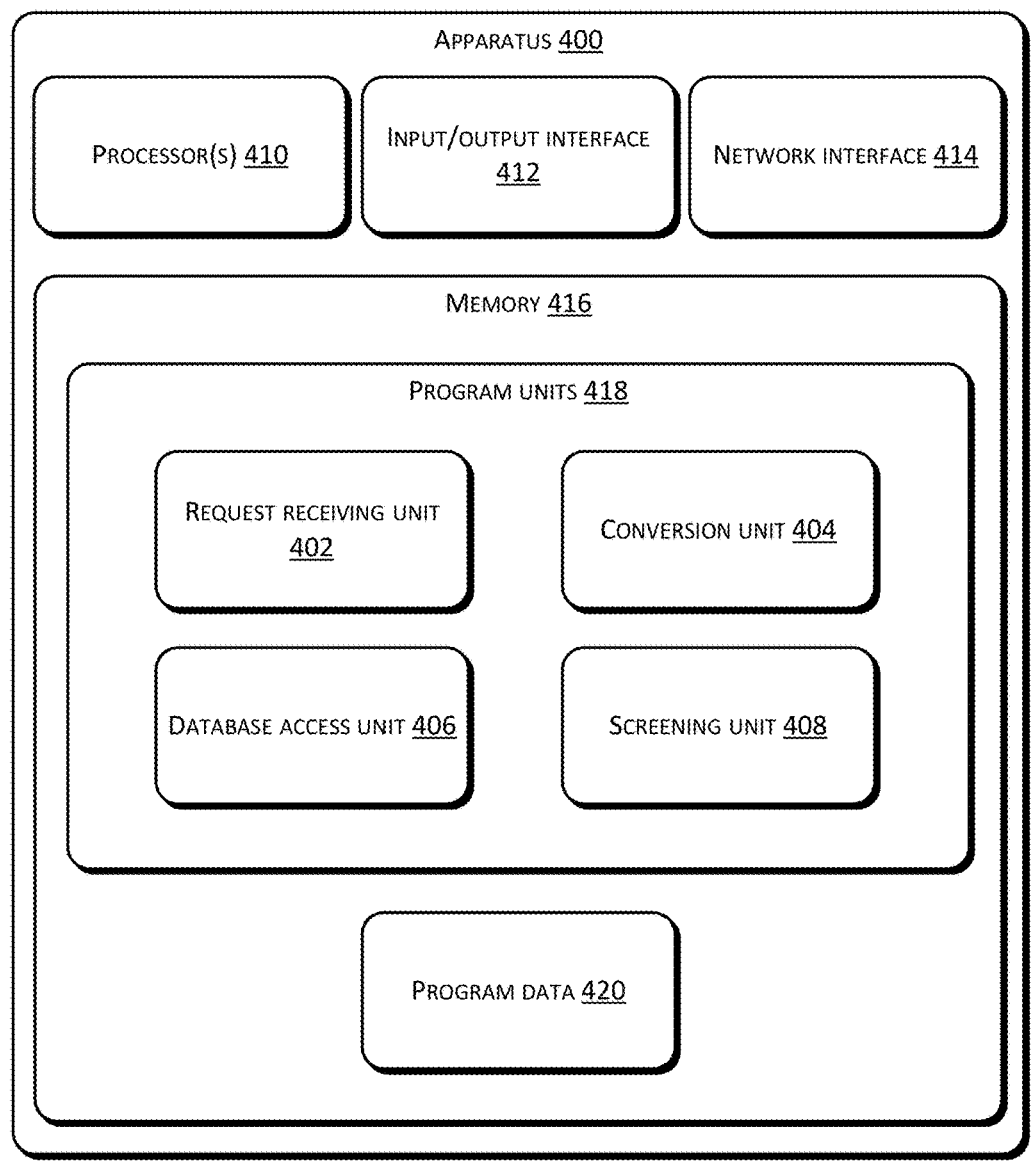
FIG. 4 is a logical structural diagram of an apparatus of data query in accordance with an embodiment of the present disclosure.

FIG. 4 illustrates an apparatus 400 of querying data provided by the embodiments. The queried data is stored in at least two different databases. The apparatus 400 may include a request receiving unit 402, a conversion unit 404 and a database access unit 406. The request receiving unit 402 receives a query request based on a business model. The business model includes business element(s). The conversion unit 404 converts the query request into an execution mode matching databases that are queried according to a conversion rule from the business model to a storage model. The storage model includes attribute information of the databases that are queried. The conversion rule includes a corresponding relationship between the business element(s) and attribute(s) in the databases that are queried. The database access unit 406 accesses a corresponding database according to the execution mode.

Optionally, the business model describes business scenario(s) in a metadata format, and may further include at least one of: constraint information of the business element(s), constraint information among the business element(s), instance information of the business element(s), data flow information and mapping relationship(s) with other business model(s).

Optionally, the storage model describes respective data storages of the databases that are queried, and may further include at least one of: stored data source name(s), stored data source type(s), storage sharding mode(s) and stored data region name(s).

In an embodiment, the conversion unit 404 converts the query request into an execution mode that matches with storage engine types of the databases that are queried according to the storage engine types.

The query request may include storage acquisition condition(s) and result filtering condition(s) based on the business element(s). In this case, the conversion unit 404 converts the query request into an execution mode that matches with the databases that are queried by using the storage acquisition condition(s) as query condition(s). The apparatus 400 may further include: a screening unit 408 to screen access results acquired from each database according to the result filtering condition(s).

As can be seen from the foregoing method and apparatus embodiments, the embodiments of the present disclosure establish a business model and a storage model as compared to the existing technologies in which data is imported and exported between different databases. A user conducts a query based on the business model, and a query request of the user is converted into an access instruction for a database through a conversion rule between the business model and the storage model. A uniform query for various types of databases can thus be realized, thereby having more comprehensive querying of data. Furthermore, a difference between low-layer databases is masked from the user, and querying becomes more convenient.

In an embodiment, the apparatus 400 may include one or more computing devices. For example, the apparatus 400 may further include one or more processors 410, an input/output interface 412, a network interface 414 and memory 416.

The memory 416 may include a form of computer readable media such as volatile memory, Random Access Memory (RAM), and/or non-volatile memory, e.g., Read-Only Memory (ROM) or flash RAM, etc. The memory 416 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 416 may include program units 418 and program data 420. The program units 418 may include the request receiving unit 402, the conversion unit 404, the database access unit 406 and the screening unit 408. Details of these units have been described in the foregoing and therefore are not repeatedly described herein.

It should also be noted that terms such as "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include a/an . . . " does not exclude any other similar elements from existing in the process, method, product or apparatus.

One skilled in the art should understand that the embodiments of the present disclosure can be provided as a method, a system or a computer program product. Therefore, the present disclosure can be implemented as an embodiment of only hardware, an embodiment of only software or an embodiment of a combination of hardware and software. Moreover, the present disclosure can be implemented as a computer program product that may be stored in one or more computer readable storage media (which includes but is not limited to, a magnetic disk, a CD-ROM or an optical disk, etc.) that store computer-executable instructions.

The above descriptions are merely exemplary embodiments of the present disclosure, and are not intended to limit the present disclosure. Any modifications, equivalent replacements and improvements, etc., made within the spirit and principle of the present disclosure should be included in the protection scope of the present disclosure.

The invention claimed is:

1. A method implemented by one or more computing devices, the method comprising:
   receiving a query request for data stored in at least two different databases, the query request based at least in part on a business model, the business model comprising one or more business elements;
   generating a uniform query that masks a difference among the at least two different databases by converting the query request into one or more execution modes that match with the at least two different databases to be queried based at least in part on a conversion rule between the business model and a storage model, the storage model comprising attribute information of the at least two different databases to be queried and the conversion rule comprising a corresponding relationship between the one or more business elements and one or more attributes in the at least two different databases to be queried;
   accessing the at least two different databases according to the one or more execution modes; and
   upon determining that an amount of concurrent accesses to one of the at least two different databases according to the one or more execution modes exceeds a predetermined amount,
      delaying a subsequent access to the one of the at least two different databases, or
      accessing a backup database, if available, of the one of the at least two different databases, the backup database having less concurrent accesses than the one of the at least two different databases.

2. The method of claim 1, wherein the business model describes one or more business scenarios in a metadata format.

3. The method of claim 2, wherein the one or more business elements comprise a plurality of business elements, and the business model further comprises at least one of:
   constraint information of the plurality of business elements,
   constraint information among the plurality of business elements,
   instance information of the plurality of business elements,
   data flow information, or
   one or more mapping relationships with one or more other business models.

4. The method of claim 1, wherein the storage model describes a data storage of the at least two different databases.

5. The method of claim 4, wherein the storage model further comprises at least one of:
   a stored data source name,
   a stored data source type,
   a storage sharding mode, or
   a stored data region name.

6. The method of claim 1, wherein converting the query request into the execution mode that matches with the at least two different databases comprises converting the query request into an execution mode that matches with respective storage engine types of the at least two different databases.

7. The method of claim 1, wherein the query request comprises a storage acquisition condition and a result filtering condition based at least in part on the business elements.

8. The method of claim 7, further comprising:
screening an access result acquired from each database of the at least two different databases based at least in part on the result filtering condition, wherein converting the query request comprises:
converting the query request into the execution mode by using the storage acquisition condition as a query condition.

9. An apparatus comprising:
one or more processors;
memory;
a request receiving unit stored in the memory and executable by the one or more processors configured to receive a request for querying data stored in at least two databases based at least in part on a business model, the business model comprising one or more business elements;
a conversion unit stored in the memory and executable by the one or more processors configured to generate a uniform query that masks a difference among the at least two different databases by converting the query request into one or more execution modes that match with the at least two databases based at least in part on a conversion rule from the business model to a storage model, the storage model comprising attribute information of the at least two databases and the conversion rule comprising a corresponding relationship between the one or more business elements and one or more attributes in the at least two databases; and
a database access unit stored in the memory and executable by the one or more processors configured to access the at least two databases according to the one or more execution modes, the database access unit further configured to, upon determining that an amount of concurrent accesses to one of the at least two different databases according to the one or more execution modes exceeds a predetermined amount:
delay a subsequent access to the one of the at least two different databases, or
access a backup database, if available, of the one of the at least two different databases, the backup database having less concurrent accesses than the one of the at least two different databases.

10. The apparatus of claim 9, wherein the business model describes business scenarios through a metadata format.

11. The apparatus of claim 10, wherein the business model further comprises at least one of:
constraint information of the business elements,
constraint information between the business elements,
instance information of the business elements, data flow information, or
one or more mapping relationships with one or more other business models.

12. The apparatus of claim 9, wherein the storage model describes respective data storages of the at least two databases.

13. The apparatus of claim 12, wherein the storage model further comprises at least one of:
a stored data source name,
a stored data source type,
a storage sharding mode, or
a stored data region name.

14. The apparatus of claim 9, wherein the conversion unit is further configured to convert the query request into an execution mode that matches with respective storage engine types of the at least two databases.

15. The apparatus of claim 9, wherein the query request comprises a storage acquisition condition and a result filtering condition based at least in part on the one or more business elements.

16. The apparatus of claim 15, wherein the conversion unit is further configured to convert the query request by using the storage acquisition condition as a query condition, and wherein the apparatus further comprises a screening unit stored in the memory and executable by the one or more processors to screen an access result acquired from each database based at least in part on the result filtering condition.

17. One or more computer-readable media storing executable instructions that, when executed by one or more processors, cause the one or more processors to perform acts comprising:
receiving a query request for data stored in at least two databases, the query request based at least in part on a business model, the business model comprising one or more business elements;
generating a uniform query that masks a difference among the at least two different databases by converting the query request into an execution mode that matches with the at least two different databases to be queried based at least in part on a conversion rule between the business model and a storage model, the storage model comprising attribute information of the at least two databases to be queried and the conversion rule comprising a corresponding relationship between the one or more business elements and one or more attributes in the at least two databases to be queried; and
accessing the at least two databases according to the execution mode; and
upon determining that an amount of concurrent accesses to one of the at least two different databases according to the one or more execution modes exceeds a predetermined amount,
delaying a subsequent access to the one of the at least two different databases, or
accessing a backup database, if available, of the one of the at least two different databases, the backup database having less concurrent accesses than the one of the at least two different databases.

18. The one or more computer-readable media of claim 17,
wherein the business model describes one or more business scenarios in a metadata format, and
wherein the business model further comprises at least one of:
constraint information of the plurality of business elements,
constraint information among the plurality of business elements,
instance information of the plurality of business elements, data flow information, or
one or more mapping relationships with one or more other business models.

19. The one or more computer-readable media of claim 17,
wherein the storage model describes a data storage of the at least two databases, and
wherein the storage model further comprises at least one of:
a stored data source name,
a stored data source type,
a storage sharding mode, or
a stored data region name.

20. The one or more computer-readable media of claim 17, wherein converting the query request comprises one of:
converting the query request into an execution mode that matches with respective storage engine types of the at least two different databases; or
converting the query request into the execution mode by using a storage acquisition condition as a query condition, and screening an access result acquired from each database of the at least two databases based at least in part on a result filtering condition, wherein the query request comprises a storage acquisition condition and a result filtering condition based at least in part on the business elements.

\* \* \* \* \*